United States Patent
Choi et al.

(10) Patent No.: US 7,621,539 B2
(45) Date of Patent: Nov. 24, 2009

(54) ACTUATOR FOR AGCS OF VEHICLE

(75) Inventors: Hae Ryong Choi, Seoul (KR); Un Koo Lee, Seoul (KR); Sang Ho Lee, Yongin-si (KR); Hyun Sung, Hwaseong-si (KR); Jung Won Kim, Yongin-si (KR); Sung Jun Kim, Pusan (KR); Young Kwang Kim, Hwaseong-si (KR); In Ho Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 11/648,438

(22) Filed: Dec. 29, 2006

(65) Prior Publication Data

US 2008/0079225 A1  Apr. 3, 2008

(30) Foreign Application Priority Data

Oct. 2, 2006 (KR) ..................... 10-2006-0097014

(51) Int. Cl.
*B60G 7/04* (2006.01)
*B60G 17/016* (2006.01)
*F16C 19/32* (2006.01)
*F16C 23/00* (2006.01)

(52) U.S. Cl. ..................... 280/5.52; 74/89.36; 364/619; 364/620

(58) Field of Classification Search ................. 280/5.52, 280/5.516, 5.522, 5.523, 707, 86.758, 93.51; 74/167, 169, 421 A, 570.3, 89.36, 89.44; 384/619, 620

See application file for complete search history.

(56) References Cited

U.S. PATENT DOCUMENTS

| | | | |
|---|---|---|---|
| 2,981,518 A * | 4/1961 | Wise ........................... | 254/101 |
| 4,588,198 A * | 5/1986 | Kanazawa et al. ............ | 280/90 |
| 4,890,858 A | 1/1990 | Blankenship | |
| 5,157,987 A * | 10/1992 | Satoh et al. .................... | 74/581 |
| 5,449,193 A * | 9/1995 | Rivard et al. ........... | 280/124.152 |
| 5,529,316 A * | 6/1996 | Mattila ..................... | 280/93.51 |
| 5,934,696 A * | 8/1999 | Bloser et al. .......... | 280/124.106 |
| 5,967,529 A * | 10/1999 | Kopczynski ............. | 280/6.155 |
| 6,857,787 B1 * | 2/2005 | Meier et al. .................. | 384/619 |
| 7,416,199 B2 * | 8/2008 | Yamada ................. | 280/93.502 |
| 2004/0262873 A1 * | 12/2004 | Wolf et al. ............... | 280/93.51 |
| 2005/0115343 A1 * | 6/2005 | Sakamaki ................... | 74/89.23 |
| 2007/0080509 A1 * | 4/2007 | Kim .......................... | 280/5.52 |
| 2007/0193383 A1 * | 8/2007 | Toshima et al. .......... | 74/388 PS |
| 2008/0079225 A1 * | 4/2008 | Choi et al. ................. | 280/5.52 |

FOREIGN PATENT DOCUMENTS

| | | |
|---|---|---|
| JP | 62-139767 | 6/1987 |
| JP | 02-042224 | 2/1990 |
| JP | 08-152038 | 6/1996 |
| JP | 09-065607 | 3/1997 |
| KR | 10-2003-0096712 | 12/2003 |

\* cited by examiner

*Primary Examiner*—Paul N Dickson
*Assistant Examiner*—Karen Jane J Amores
(74) *Attorney, Agent, or Firm*—Edwards Angell Palmer & Dodge LLP; Peter F. Corless

(57) ABSTRACT

The present invention provides an actuator for AGCS of a vehicle having a piston reciprocating rectilinearly, a screw bar engaged with the rear portion of the piston and rotating in place, and a drive motor rotating the screw bar in place, the actuator comprising an impact buffering means for buffering a load in the axial direction and an impact absorbing means for absorbing a load in the vertical direction to the axis, the impact buffering means and impact absorbing means being provided on the boundary portion between the screw bar and the motor.

4 Claims, 6 Drawing Sheets

Load transferred in the axial direction

ACTUATOR FOR AGCS OF VEHICLE

CROSS-REFERENCE TO RELATED APPLICATION

This application claims the benefit of Korean Patent Application No. 10-2006-0097014 filed with the Korean Intellectual Property Office on Oct. 2, 2006, the entire disclosure of which is hereby incorporated by reference.

BACKGOUND OF THE INVENTION

1. Field of the Invention

The present invention relates to an actuator for an active geometry control suspension (AGCS) of a vehicle. More particularly, the present invention relates to an actuator for AGCS of a vehicle having a buffering structure in a boundary portion between a motor and a rectilinear reciprocating portion, which provides impact resistance against the external forces acting in the axial direction and the vertical direction to the axis.

2. Background Art

In general, an active geometry control suspension (AGCS) denotes a system that provides cornering stability by controlling the rear toe angle of a vehicle when the vehicle corners to extend the rear wheels to be within the region capable of cornering.

A general structure of AGCS will be described with reference to FIG. 5.

The AGCS comprises an assist link 102 linked to a rear wheel 106, a control lever 104 connected with an end of the assist link 102, an actuator 100 connected with an end of the control lever 104, and an ECU 112 receiving signals from a vehicle speed sensor 108 and a steering angle sensor 110 and controlling the actuator 100.

In more detail, the control lever 104 includes a horizontal lever 116 connected with the assist link 102 by means of a hinge and a vertical lever 118 linked to a piston 114 of the actuator 100 by means of a hinge, the lower end of the vertical lever 118 and the rear end of the horizontal lever 116 being coupled rectangularly with each other.

Moreover, the actuator 100 includes a piston 114 reciprocating rectilinearly, a screw bar 120 inserted and engaged into the rear portion of the piston 114 and rotating in place, and a motor 122 rotating the screw bar 120 in place.

A ball bearing 124 supporting the screw bar 120 rotating in place is mounted on a boundary portion between the motor 122 and an end of the screw bar 120.

The operation state of the AGCS described above will be described with reference to FIG. 6.

First, the ECU 112 receives signals from the vehicle speed sensor 108 and the steering angle sensor 110. Based on the signals, the ECU determined whether the vehicle is cornering. If the vehicle is cornering, the ECU 112 transmits a drive signal to the motor 122.

Subsequently, the screw bar 120 rotates in place along with the rotational drive of the motor 122. The piston 114 then reciprocates forward.

As the piston 114 reciprocates forward (i.e., toward the rear wheel), the upper end of the vertical lever 118 of the control lever 104 moves forward. (See arrow "a" in FIG. 6) Simultaneously, the joining point of the lower end of the vertical lever 118 and the rear end of the horizontal lever 116 is lifted up backward and rotated forward (i.e., toward the rear wheel). (See arrow "b" in FIG. 6) Also, the front end of the horizontal lever 116 is rotated downward. (See arrow "c" in FIG. 6).

As the front end of the horizontal lever 116 of the control lever 104 is rotated downward, the assist link 102 is pulled backward and moves downward. (See arrow "d" in FIG. 6).

As a result, the joining point of the assist link 102 on the side of vehicle body ("A" in FIG. 6, a joining point with the front end of the horizontal lever 116) moves downward, thereby increasing a bump toe-in value of the vehicle. Accordingly, cornering stability of the vehicle when cornering at a high speed or during the rapid lane change can be improved and overall vehicle driving performance can be improved.

However, the actuator in such conventional AGCSs has a drawback in terms of durability as set forth below.

As depicted in FIGS. 4A and 4B, the ball bearing 124, which is mounted on a boundary portion between the motor 122 and an end of the screw bar 120 (i.e., on the circumferential surface of the rear portion of the screw bar 120) and supports the screw bar 120 rotating in place, receives loads in the axial direction and in the vertical direction to the axis as well. For this reason, the ball bearing may be damaged and noise due to the damage may occur.

More particularly, an impact (a load in the axial direction or a load in the vertical direction to the axis) generated in the wheel is transferred to the piston 114 and the screw bar 120 via the assist link 102 and the control lever 104, and the impact is eventually concentrated upon the ball bearing supporting the screw bar 120, thus causing a damage to the ball bearing 124 and noise due to the damage.

As an attempt to solve this problem, Japanese Patent Publication No. 1987-139767 discloses an actuator structure having a thrust bearing therein. However, the thrust bearing is applied to a portion to which a direct load of external force is not delivered. Accordingly, if a strong external force is applied, the thrust bearing may be damaged.

SUMMARY OF THE INVENTION

The present invention has been made to provide an actuator for AGCS of a vehicle having an impact buffering and noise absorbing structure.

In one aspect, the present invention provides an actuator for AGCS of a vehicle having a piston reciprocating rectilinearly, a screw bar engaged with the rear portion of the piston and rotating in place, and a drive motor rotating the screw bar in place, comprising: an impact buffering means for buffering a load in the axial direction and an impact absorbing means for absorbing a load in the vertical direction to the axis, the impact buffering means and the impact absorbing means being provided on the boundary portion between the screw bar and the motor.

In a preferred embodiment, the impact buffering means comprises: a disc thrust arranged on the circumferential surface of the rear portion of the screw bar which is corresponding to a joining point with the motor; a pair of thrust bearings arranged closely to both surfaces of the disc thrust; and a pair of plate thrust bearings each of which is provided closely to outer surface of each of the thrust bearings.

In another preferred embodiment, the impact absorbing means is a bush-oilless metallic body arranged closely to the outer surface of one of the plate thrust bearings.

In another aspect, motor vehicles are provided that comprise a described actuator.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and

DETAILED DESCRIPTION

Hereinafter, preferred embodiments of the present invention will now be described in detail with reference to the attached drawings.

Figure 1:
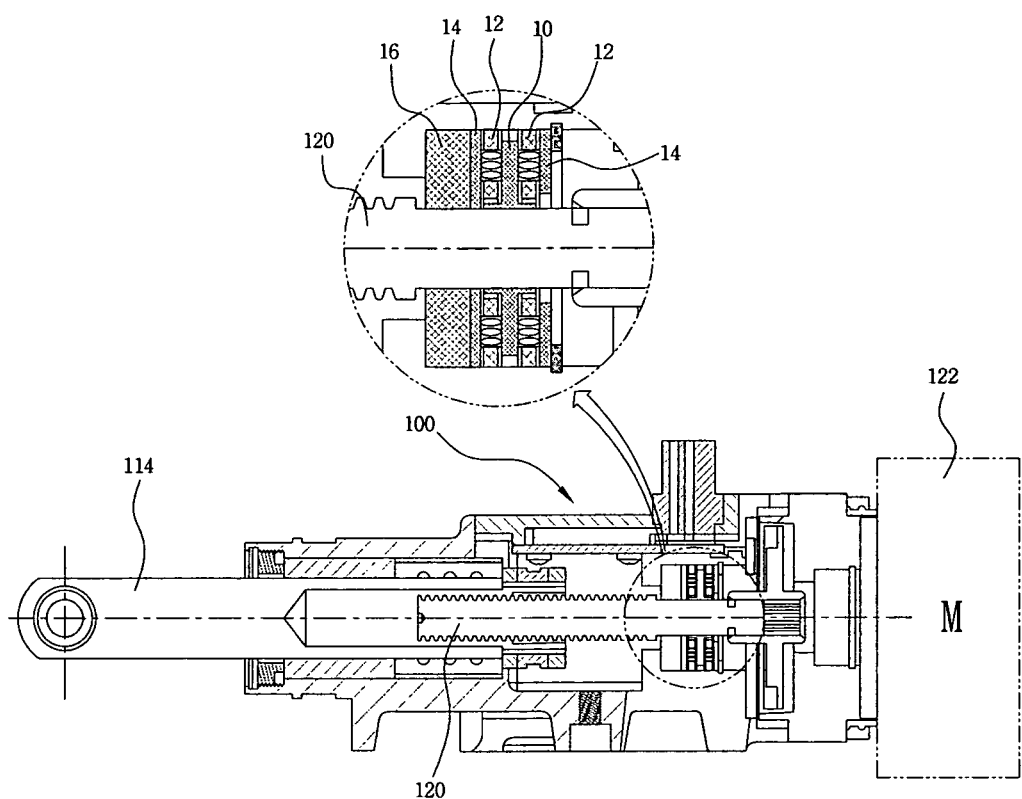
FIG. 1 is a sectional view depicting an actuator for AGCS of a vehicle in accordance with the present invention.

FIG. 1 is a sectional view depicting an actuator for AGCS of a vehicle in accordance with the present invention.

As described above, an AGCS for vehicle comprises an assist link 102 linked to a rear wheel 106, a control lever 104 connected with an end of the assist link 102, an actuator 100 connected with an end of the control lever 104, and an ECU 112 receiving signals from a vehicle speed sensor 108 and a steering angle sensor 110 and controlling the drive of the actuator 100. The actuator 100 includes a piston 114 reciprocating rectilinearly, a screw bar 120 inserted and engaged into the rear portion of the piston 114 and rotating in place, and a motor 122 rotating the screw bar 120 in place.

In a preferred embodiment, an impact buffering means and an impact absorbing means are provided. More particularly, an impact buffering means is provided in a boundary portion between the screw bar 120 and the motor 122 (i.e., on a joining point therebetween) to buffer a load in the axial direction delivered from the wheel to the actuator 100. Also, an impact absorbing means is provided to absorb a load in the vertical direction to the axis delivered from the wheel to the actuator 100.

The impact buffering means, arranged on the circumferential surface of the rear portion of the screw bar 120 (i.e., on a joining point with the motor 122), plays a role of buffering the load in the axial direction delivered from the wheel to the actuator 100.

The impact buffering means includes: a disc thrust 10 mounted on the circumferential surface of the rear portion of the screw bar 120 (i.e., on a joining point with the motor 122); a pair of thrust bearings 12 arranged closely to both surfaces of the disc thrust 10; and a pair of plate thrust bearings 14 each of which is arranged closely to outer surface of each of the thrust bearings 12.

Accordingly, if the screw bar 120 rotates in place along with the rotational drive of the motor 122, the disc thrust 10 engaged on the circumferential surface of the rear portion of the screw bar 120 rotates in place, and both surfaces of the disc thrust 10 are then rolling-contacted with the thrust bearings 12.

The plate thrust bearings 14 are adhered closely to the outer surfaces of the thrust bearings 12 and support the rolling motion of the thrust bearings 12.

Figure 2:
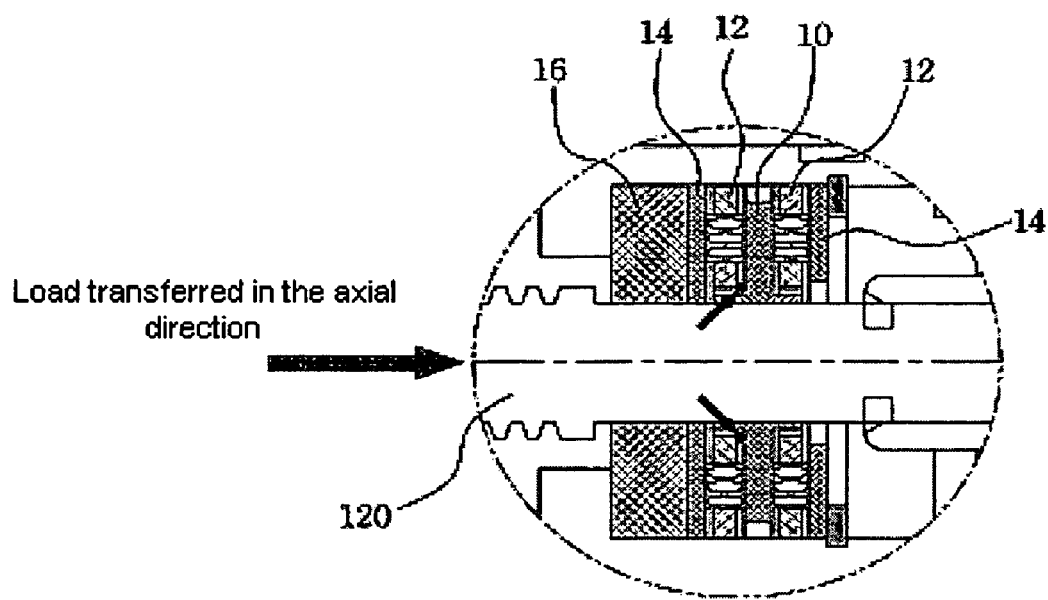
FIG. 2 is a sectional view illustrating buffering operation against a load in the axial direction of an actuator for AGCS of a vehicle in accordance with the present invention.

FIG. 2 is a sectional view illustrating buffering operation against a load in the axial direction of an actuator for AGCS of a vehicle in accordance with the present invention.

The load in the axial direction generated in the wheel is delivered to the piston 114 and the screw bar 120 of the actuator 100 via the assist link 102 and the control lever 104. The axial load, in turn, is transferred directly to the disc thrust 10 adhered closely to the screw bar 120, not to the thrust bearings 12 adhered closely to both surfaces of the disc thrust 10.

More particularly, as depicted in FIG. 2, the axial load is delivered to the lower portion of the disc thrust 10 adhered closely to the circumferential surface of the screw bar 120 and is dispersed and dissipated, thereby not being transferred directly to the thrust bearings 12. For this reason, even if the axial load acts, the disc thrust 10 buffers and disperses the load. Consequently, the durability can be improved. Also, it is possible to solve the problems associated with conventional actuators; damage to the ball bearing and the noise due to the damage.

The impact absorbing means is a bush-oilless metallic body 16. Preferably, the impact absorbing means is arranged closely to the outer surface of one of the plate thrust bearings 14. More preferably, it is arranged closely to the outer surface of the plate thrust bearings on the piston side of the actuator. The bush-oilless metallic body 16 is of a circular ring type and arranged on the circumferential surface of the screw bar 120.

If the screw bar 120 rotates in place along with the rotational drive of the motor 122, the screw bar 120 rotates in place inside the bush-oilless metallic body 16 without using a separate lubricant.

Figure 3:
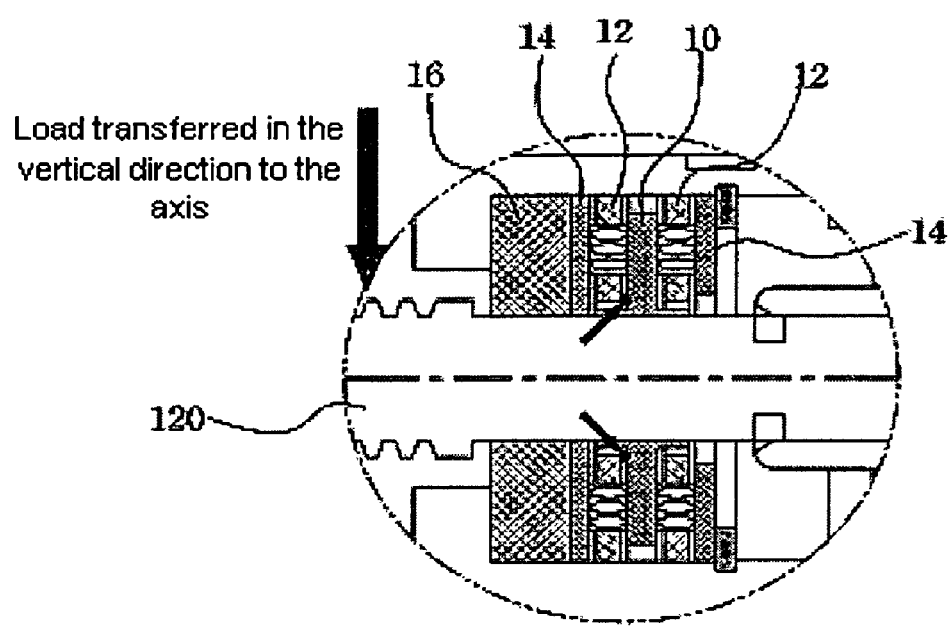
FIG. 3 is a sectional view illustrating impact absorbing operation against a load in the vertical direction to an axis of an actuator for AGCS of a vehicle in accordance with the present invention.
Figure 4A:
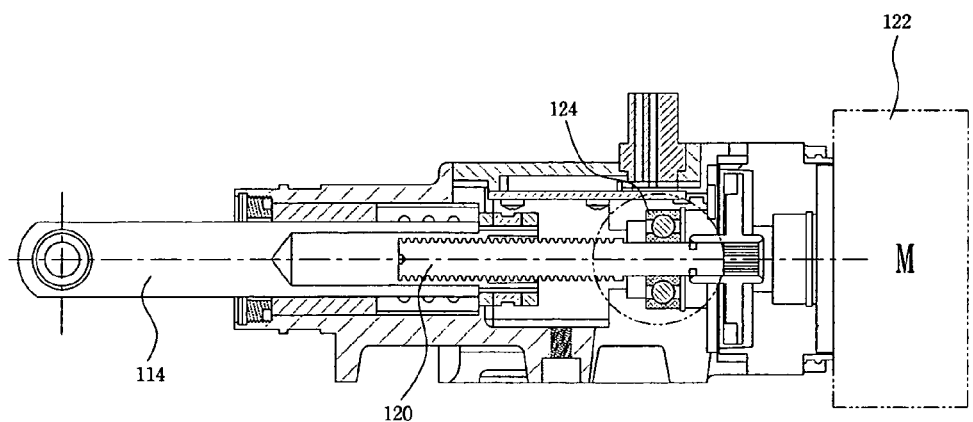
FIGS. 4A and 4B are sectional views showing a conventional actuator for AGCS of a vehicle.
Figure 4B:
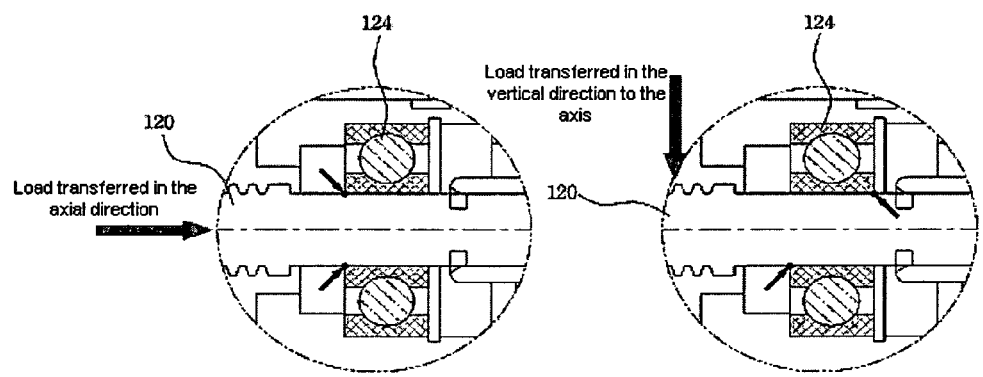
Figure 5:
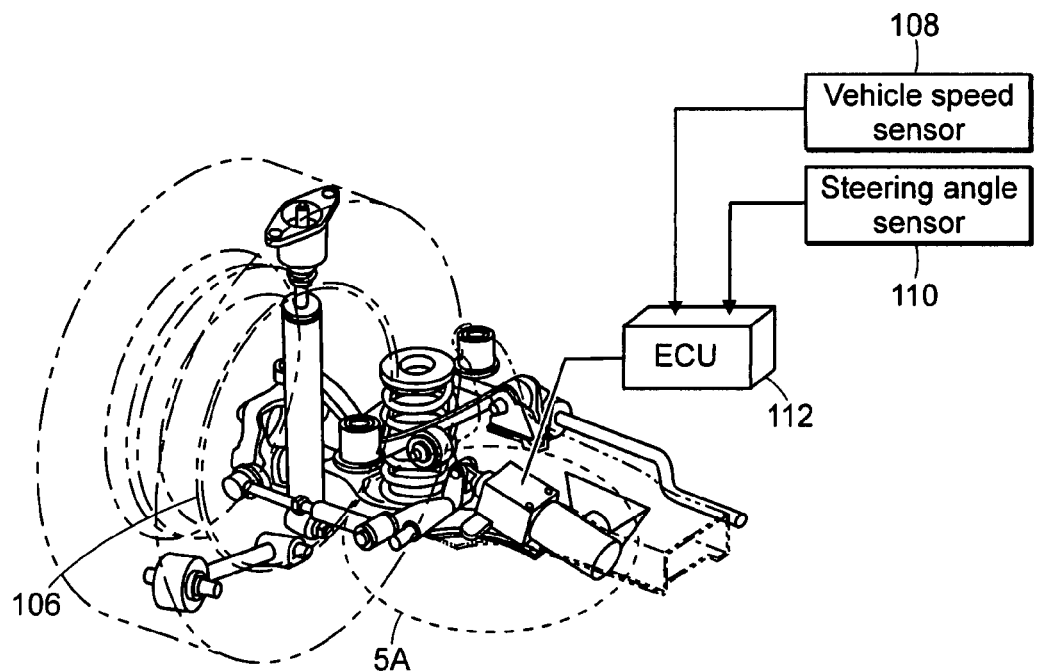
FIG. 5 is a schematic diagram illustrating configuration of an AGCS for a vehicle.
Figure 5A:
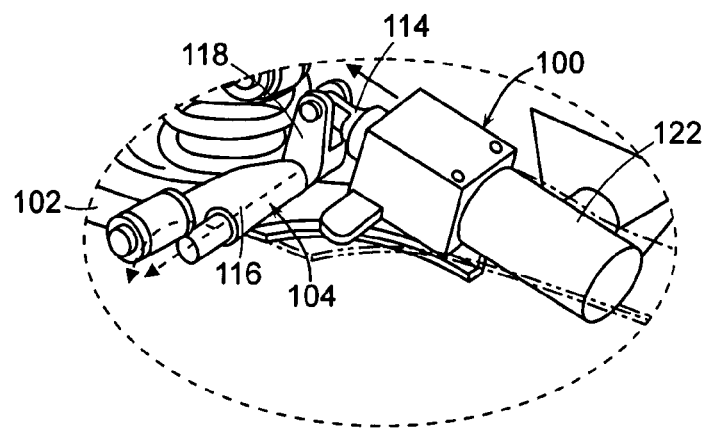
Figure 6:
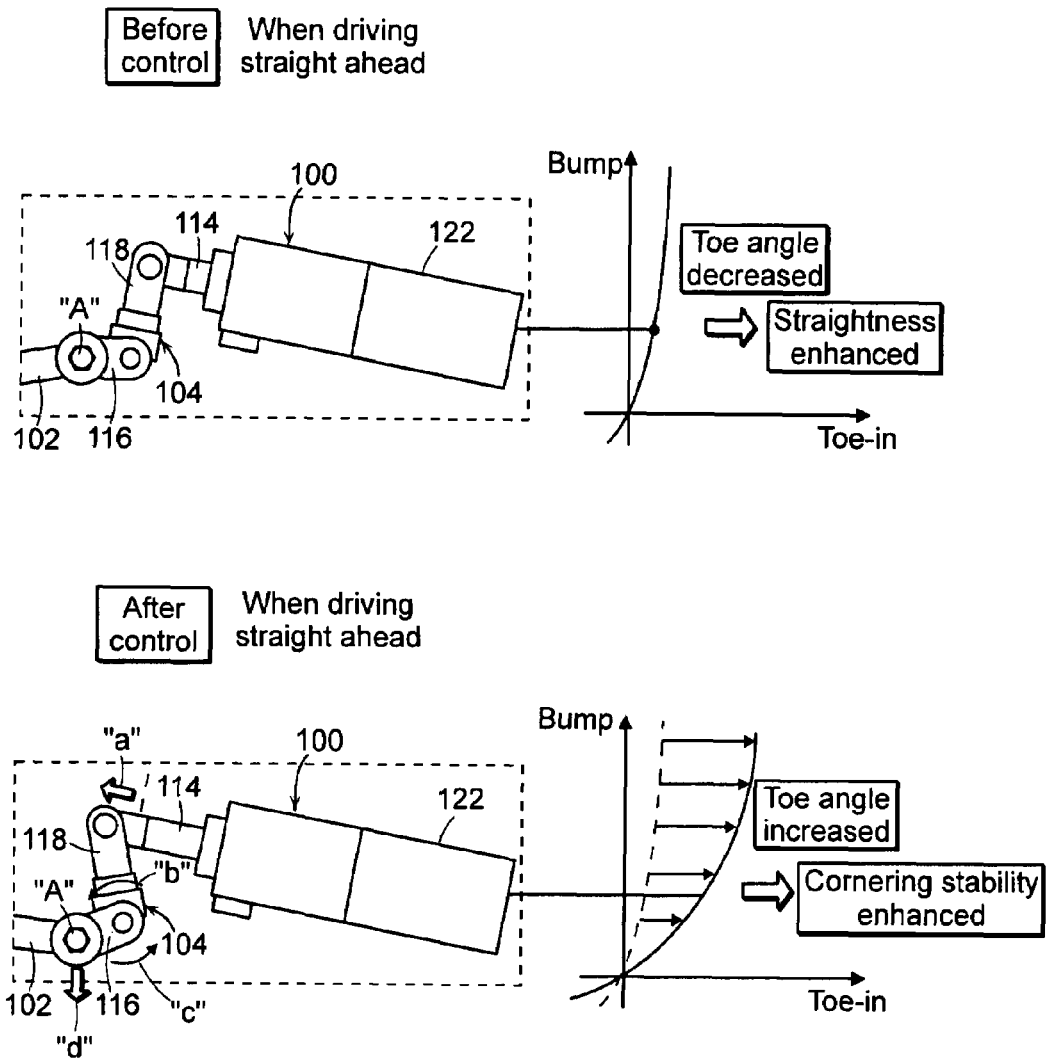
FIG. 6 is a schematic diagram illustrating operation state of an AGCS for a vehicle.

FIG. 3 is a sectional view illustrating impact absorbing operation against a load in the vertical direction to an axis of an actuator for AGCS of a vehicle in accordance with the present invention.

The load in the vertical direction to the axis generated in the wheel is delivered to the piston 114 and the screw bar 120 of the actuator 100. The load in the vertical direction to the axis is in turn transferred directly to the bush-oilless metallic body 16 adhered closely to the circumferential surface of the screw bar 120. The bush-oilless metallic body 16 performs impact absorbing operation for dispersing and dissipating the load in the vertical direction to the axis. Consequently, the load in the vertical direction to the axis is not transferred directly to the thrust bearings 12, thus increasing the durability of the joining point between the screw bar and the motor.

As described above, according to an actuator for AGCS of a vehicle in accordance with the present invention, a newly-designed impact buffering and absorbing structure, which can firmly bear the impact (the load in the axial direction or the load in the vertical direction to the axis) generated in the wheel, is applied to the boundary portion between the screw bar and the motor so as to buffer and absorb the impacts in the axial direction and in the vertical direction to the axis readily, even if the loads are delivered to the actuator, thus enhancing the durability of the boundary portion between the screw bar and the motor of the actuator.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An actuator for active geometry control suspension of a vehicle, comprising:
   a piston reciprocating rectilinearly, a screw bar engaged with the rear portion of the piston and rotating in place, and a drive motor rotating the screw bar in place, the actuator comprising an impact buffering means for buffering a load in the axial direction and an impact absorbing means for absorbing a load in the vertical direction to the axis, the impact buffering means and impact absorbing means being provided on a boundary portion between the screw bar and the motor,
   wherein the impact buffering means comprises: a disc thrust arranged on the circumferential surface of the rear portion of the screw bar, which is corresponding to a joining point with the motor; a pair of thrust bearings arranged closely to both surfaces of the disc thrust; and a pair of plate thrust bearings each of which is provided closely to the outer surface of each of thrust bearings.

2. The actuator for active geometry control suspension a vehicle as recited in claim 1, wherein the impact absorbing means is a bush-oilless metallic body arranged closely to the outer surface of one of the plate thrust bearings.

3. The actuator for active geometry control suspension of a vehicle as recited in claim 1, wherein a bush-oilless metallic body is provided closely to the outer surface of the plate thrust bearings on the piston side of the actuator.

4. An actuator for active geometry control suspension of a vehicle, comprising:
   a piston reciprocating rectilinearly, a screw bar engaged with the rear portion of the piston and rotating in place, and a drive motor rotating the screw bar in place, the actuator comprising an impact buffer for buffering a load in the axial direction and an impact absorber for absorbing a load in the vertical direction to the axis, the impact buffer and impact absorber being provided on a boundary portion between the screw bar and the motor,
   wherein the impact buffering means comprises: a disc thrust arranged on the circumferential surface of the rear portion of the screw bar, which is corresponding to a joining point with the motor; a pair of thrust bearings arranged closely to both surfaces of the disc thrust; and a pair of plate thrust bearings each of which is provided closely to the outer surface of each of thrust bearings.

* * * * *